United States Patent [19]
Minniear et al.

[11] 3,866,056

[45] Feb. 11, 1975

[54] SCANNING APPARATUS

[75] Inventors: Max E. Minniear, Dayton; Carlos B. Herrin, Bellbrook, both of Ohio

[73] Assignee: Monarch Marking Systems, Inc., Dayton, Ohio

[22] Filed: Dec. 17, 1973

[21] Appl. No.: 425,396

[52] U.S. Cl. ........... 250/566, 235/61.11 E, 250/568
[51] Int. Cl. ........................................... G01n 21/30
[58] Field of Search .................... 250/566, 568, 570; 235/61.11 E

[56] References Cited

UNITED STATES PATENTS

| | | | |
|---|---|---|---|
| 3,413,447 | 11/1968 | Lamers | 250/566 |
| 3,474,234 | 10/1969 | Rieger | 250/566 |
| 3,585,366 | 6/1971 | Kern | 235/61.11 E |
| 3,735,142 | 5/1973 | Harr | 235/61.11 E |

*Primary Examiner*—James W. Lawrence
*Assistant Examiner*—D. C. Nelms
*Attorney, Agent, or Firm*—Joseph J. Grass

[57] ABSTRACT

There is disclosed apparatus for scanning a concave coded record which is adapted to be disposed in the inside of an open-ended tube. A rotor carries a source of illumination which illuminates the record. Light reflected from the record is reflected onto a mirror carried by the rotor and passes along the axis of rotation of the rotor through a suitable lens or lenses and is focused on a mask. The mask has an aperture through which light passes to a light receptor such as a photodetector. The light receptor is stationarily mounted to the frame. The frame also mounts a motor for driving the rotor and bearings for rotatably mounting the rotor. A cover adapted to abut the end of the tube is mounted for movement between one position in which the cover is in the reflected light path and another position in which the cover is out of the reflected light path. A spring normally urges the cover into the one position but when the cover is moved into contact with the end of the tube the cover is moved to the other position at which the light receptor can receive light reflected from the coded record.

14 Claims, 6 Drawing Figures

SCANNING APPARATUS

SUMMARY OF THE INVENTION

The purpose of the invention is to provide apparatus capable of reading or scanning a concave coded record such as a label adhered to the inner surface of a circular cylindrical, open-ended tube. A specific embodiment of the apparatus comprises a rotor rotatable about an axis of rotation, a light source carried by the rotor, a light receptor, an optical arrangement providing a reflected light path from the coded record to the light receptor, a tip capable of entering into the tube, a cover movably mounted between one position in which the cover is in the reflected light path and another position in which the cover is out of the reflected light path, a motor for driving the rotor to effect scanning of the record when the cover is in the other position, and a spring for urging the cover into the one position, the cover having a shoulder adapted to abut the open end of the tube to enable the cover to be moved to the other position.

BACKGROUND OF THE INVENTION

1. Field of the Invention

This invention relates to the art of optical readers.

2. Brief Description of the Prior Art

The prior art includes the optical reader disclosed in U.S. Pat. application Ser. No. 104,894, filed Jan. 8, 1971, now abandoned, and continuation application Ser. No. 330,937, filed Feb. 9, 1973, now U.S. Pat. No. 3,809,893 owned by the assignee of the present application, and the following U.S. Pat. Nos.: 2,899,856; 3,211,593; 3,279,460; 3,286,087; 3,418,456; 3,474,234; 3,585,367; 3,636,317; 3,685,723; 3,689,744; and 3,720,193.

DETAILED DESCRIPTION OF THE PREFERRED EMBODIMENT

Figures 1, 2, 3:
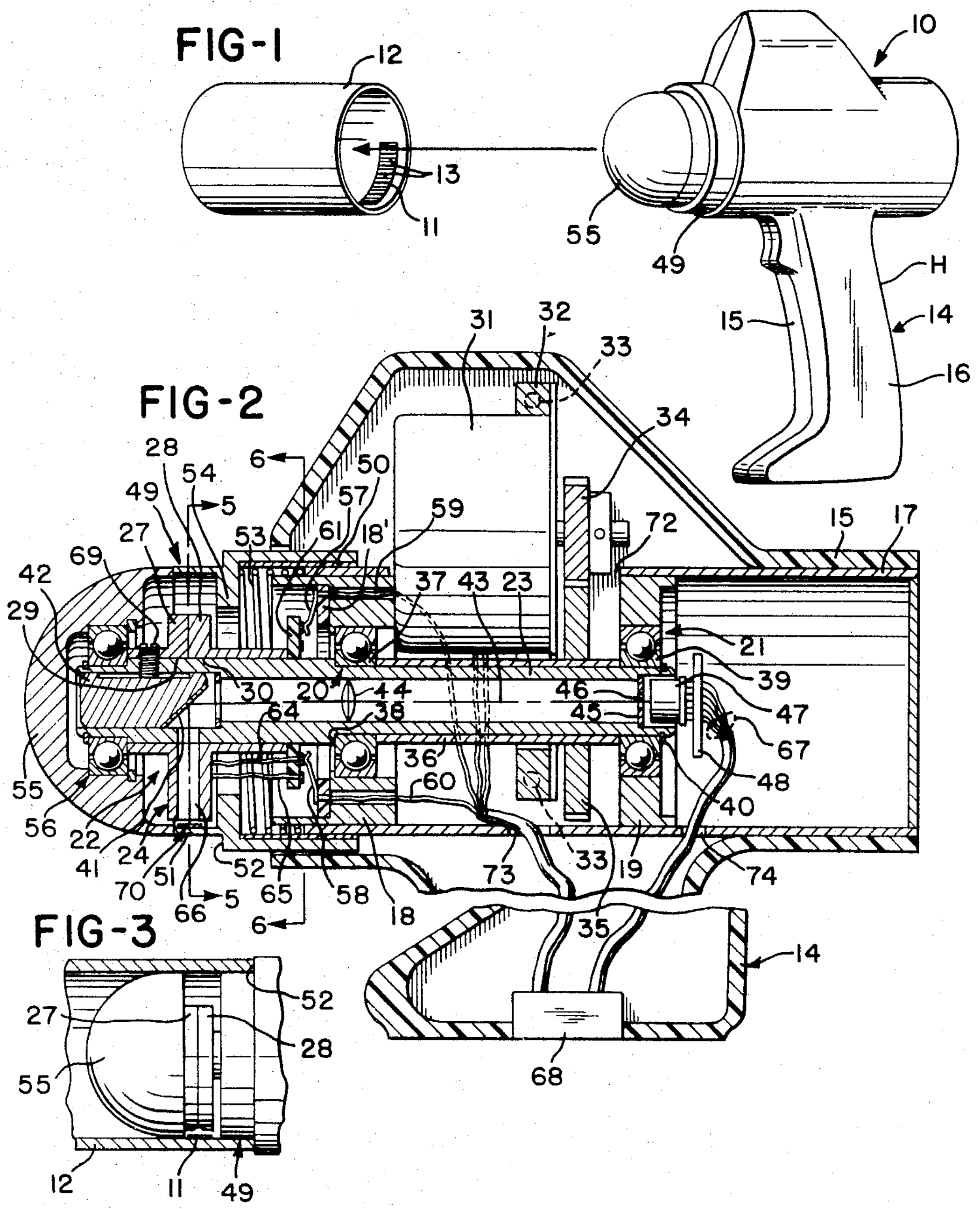
FIG. 1 is a perspective view of apparatus in accordance with a specific embodiment of the invention, together with a tube having a concave coded label extending in a circumferential direction on the inner surface of a circular cylindrical tube.
FIG. 2 is a sectional elevational view of the apparatus shown in FIG. 1.
FIG. 3 is an elevational view showing the front end of the apparatus received in an open-ended tube.
Figure 4:
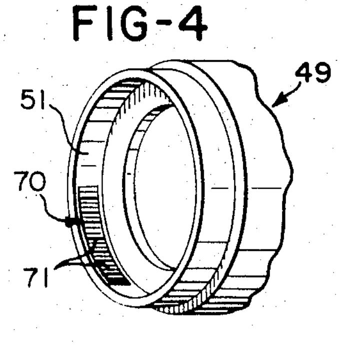
FIG. 4 is a fragmentary perspective view of a cover shown in FIGS. 1, 2 and 3.
Figures 5, 6:
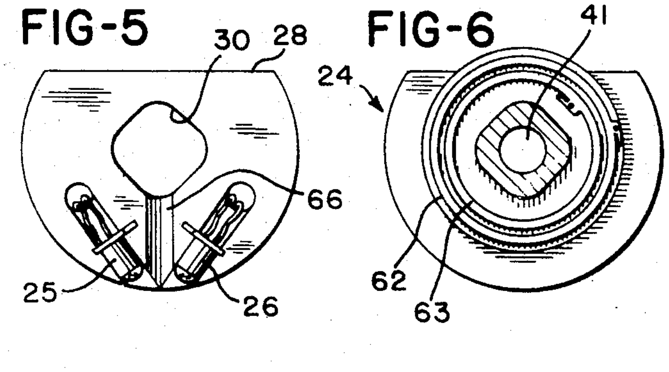
FIG. 5 is a sectional view taken along line 5—5 of FIG. 2.
FIG. 6 is a sectional view taken along line 6—6 of FIG. 2.

Referring initially to FIG. 1, there is shown an optical reader 10 for reading or scanning coded data on a record 11 disposed on the inside of an open-ended circular cylindrical tube 12. The data is shown to be comprised of code bars 13 disposed parallel to the tube axis. The record 11, in the illustrated embodiment, is a pressure-sensitive label adhered to the inner surface of the tube 12 and extends in the circumferential direction. As such, the record 11 has a concave configuration.

The optical reader 10 is shown to have a frame generally indicated at 14 comprised of mating sections 15 and 16. The sections 15 and 16 receive a generally circular cylindrical tube 17. The tube 17 receives and mounts annular, spaced-apart, mounting members 18 and 19. The mounting members 18 and 19 mount respective ball bearings 20 and 21. The bearings 20 and 21 rotatably mount a rotor generally indicated at 22. In the illustrated embodiment the rotor 22 is shown to include a tube 23 and a holder 24 for a light source comprised of light bulbs or light emitting diodes 25 and 26. The holder 24 is comprised of a pair of sections 27 and 28 received about the tube 23 and suitably adhered to each other. The portion of the tube 23 near the front end of the apparatus 10, that is, to the left of the ball bearing 20 as viewed in FIG. 2, is generally square at its outer surface. The sections 27 and 28 have respective internal holes 29 and 30 which are correspondingly generally square. This non-circular configuration prevents the sections 27 and 28 from rotating relative to the tube 23.

An electric constant speed motor 31 is secured to the section 15 by a bracket 32 as by screws 33. The motor 31 drives a pinion gear 34 which meshes with and drives a gear 35. The gear 35 receives and is suitably secured against rotation relative to a sleeve 36. The sleeve 36 in turn receives and is suitably secured against rotation relative to the tube 23. Inner race 37 of the ball bearing 20 abuts a shoulder 38 of the tube 23 and one end of the sleeve 36. Inner race 39 of the bearing 21 abuts a C-ring 40 and the other end of the sleeve 36.

The tube 23 also carries a mirror 41 provided by coating a base or support 42 with a highly reflective material. The base 42 is adjustable lengthwise of the tube 23 along its rotational axis 43. The tube also mounts a lens 44 and a mask 45. A system of one or more lenses can be employed, if desired. The mask 45 has a light aperture 46. A light receptor 47 in the form of a commercially available photoamplifier is stationarily secured to the inside of the tube 17 by a bracket 48. Clearance is provided so that the rotor 22 does not contact the light receptor 47 as the rotor 22 rotates. In that the light receptor 47 is stationary any possibility of electrical noise as would be created by using slip rings is obviated.

A cover 49 is movably mounted on the tube 17. The cover 49 is telescopically disposed relative to the tube 17. A bearing sleeve 50 is disposed between the tube 17 and the cover 49. The cover 49 has a generally circular cylindrical configuration. The front end of the cover 49 has a circular cylindrical section 51 and an annular shoulder 52. A spring 53 disposed between the end of the tube 17 and a flange 54 normally urges the terminal end of the cover section 51 against the rear end of a generally hemispherical converging tip 55. The tip 55 is rotatably mounted on the end portion of the tube 23 by a ball bearing 56.

Electrical energy is supplied to the pair of multielement brushes 57 and 58 via conductors 59 and 60. The brushes 57 and 58 are mounted on a brush holder 18 secured to mounting members 18. The brushes contact a slip ring 61 having a pair of annular contacts 62 and 63. The slip ring 61 is secured to the tube 23. The contacts 62 and 63 are connected by conductors 64 and 65 to the lamps or light emitting diodes 25 and 26. When the tip 55 is inserted into the tube 12, the shoulder 52 abuts the end of the tube 12 and the force exerted by the tube 12 causes the compression spring 53 to compress as the cover 49 is moved to the position shown in FIG. 3. There is a sufficient amount of clearance between the inside of the tube 12 and the maximum diameter of the tip 55 to enable the tip 55 to be freely inserted to the FIG. 3 position. Light from the lamps 25 and 26 is directed at and illuminates the coded record 11 to read the coded data. Light reflected from the record 11, passes through a passageway 66, onto the mirror 41, and the mirror 41 bends the reflected light along the rotational axis 43. The reflected light is gathered by the lens and is imaged on the mask 45. Some of the imaged light can pass through the aperture 46 onto the light receptor 47. Electrical energy is conducted to the light receptor or photoamplifier 47 by some of conductors 67 and an analog signal 47 generated by the photoamplifier 47 is conducted from the photoamplifier 47 by the remaining conductors 67. The conductors 59, 60 and 67 are connected to a multi-element electrical connector 68.

It is noted that although the apparatus 10 includes a handle H, the apparatus 10 can be mounted in an apparatus that is moved mechanically relatively toward and away from a tube 12.

The mirror 41 is adjustable in the direction of the rotational axis 43 by loosening set screw 69, shifting the base 42 relative to the lens 44, and thereafter tightening the screw 69. This adjustment of the mirror 41 can be used to focus the lens so that the light is more clearly imaged on the mask 45. If desired, focusing of the lens 44 can also be accomplished by adjusting the lens 44 or the mask 45. Althouogh the mirror 41 is illustrated as bending the reflected light through an angle of 90°, as is preferred, the light can be bent at other angles so long as the light reflected from the mirror or other light bending device is passed along the axis of rotation 43. While a light bending device such as a prism (not shown) can be employed instead of a mirror this is not the preferred construction.

If desired the lens 44 and the mask 45 can be stationarily mounted.

So long as the cover 49 is in the position shown in FIG. 2 the cover section 49 is in the reflected light path. But as soon as the cover 49 is moved into the position shown in FIG. 3, the cover 49 moves out of the reflected light path and the record 11 is read as the rotor 22 and the mirror 41 which it carries rotate.

A record 70 having code bars 71 is adhered to the inner surface of the cover section 51. The data on the record 70 is check data which indicates to the utilization device (not shown) which receives the analog signal that the apparatus is functioning.

It is noted that the tube 17 has certain cut-outs 72, 73 and 74 to allow space for the motor 31 and gear 34, and the conductors 59 and 60, and 67.

Instead of using lamp or light emitting diodes 25 and 26, light can be brought from an annular stationary, light diffusing ring (not shown) composed of a plastics or glass material such as is sold commercially under the name Lucite. The ring can be suitably lighted and can be disposed at the end of the tube 23 adjacent the ring. Optical fibers (not shown) extending through and rotatable as a unit with the rotor tube 23 and the rotor 24 would be optically coupled to the ring and would direct light onto the record adjacent the open end of the passageway 66.

By way of example, not limitation, the electric motor continuously rotates the rotor 22 through between about 30 and 240 revolutions per minute.

Other embodiments and modifications of this invention will suggest themselves to those skilled in the art, and all such of these as come within the spirit of this invention are included within its scope as best defined by the appended claims.

We claim:

1. Apparatus for scanning a concave coded record, comprising: a rotor, means carried by the rotor for illuminating the coded record, a light receptor, means providing a reflected light path from the coded record to the light receptor, a cover, means for movably mounting the cover for movement between one position in which the cover is in the reflected light path and another position in which the cover is out of the reflected light path, and means for driving the rotor to effect scanning of the record when the cover is in the other position.

2. Apparatus as defined in claim 1, including means for normally urging the cover into one of the positions.

3. Apparatus as defined in claim 1, wherein the cover has a generally tubular configuration, a helical spring for normally urging the cover into the one position.

4. Apparatus as defined in claim 1 and which is adapted to read the coded record positioned on the inside surface of a tube, including a converging tip adapted to enter the tube, the cover having a generally tubular configuration and being capable of contacting the tip in the one position.

5. Apparatus as defined in claim 1 and adapted to read the coded record positioned on the inside of a tube, wherein at least the portion of the cover in the reflected light path in the one position is generally tubular.

6. Apparatus as defined in claim 1 and which is adapted to read the coded record positioned on the inside of a tube, wherein at least the portion of the cover in the reflected light path is generally tubular, the inside surface of the cover being adapted to receive a coded label which is scannable while the cover is in the one position, and wherein the driving means comprises an electric motor.

7. Apparatus as defined in claim 1 and which is adapted to read the coded record positioned on the inside surface of an open-ended tube, means for urging the tube to the one position, wherein the cover has a shoulder adapted to abut the open end of the tube to enable the cover to be moved to the other position.

8. Apparatus for scanning a concave coded record, comprising: a frame, a rotor, means for rotatably mounting the rotor in the frame, means for rotatably mounting the rotor in the frame, means for driving the rotor, a cover telescopically received by the frame, a light receptor, a tip adapted to enter an open-ended tube, the cover being movable between one position in which the cover is against the tip and another position in which the cover is spaced from the tip, means carried by the rotor for illuminating the coded record, and means providing a reflected light path between the coded record and the light receptor through the space between the tip and the cover in the other position of the cover.

9. Apparatus as defined in claim 8, including means for urging the cover into the one position.

10. Apparatus as defined in claim 8, wherein the frame includes a tubular member, a bearing sleeve between the tubular member and the cover, and a spring for urging the cover into the one position.

11. Apparatus adapted to scan a record on the concave inner surface of an open-ended tube comprising: a frame, a rotor, means for rotatably mounting the rotor in the frame, means for driving the rotor, a cover telescopically received by the frame, a light receptor, a tip adapted to enter an open-ended tube, the cover being movable between one position in which the cover is against the tip and another position in which the cover is spaced from the tip, means for urging the cover to the one position, the cover having means for contacting the end of the tube so that the cover can be moved to the other position, means carried by the rotor for illuminating the coded record, and means providing a reflected light path between the coded record and the light receptor through the space between the tip and the cover in the other position of the cover.

12. Apparatus as defined in claim 11, wherein the cover comprises a generally tubular portion for closing off the space through the reflected light path in the one position of the cover.

13. Apparatus as defined in claim 11, wherein the means for contacting the end of the tube comprises generally annular shoulder means.

14. Apparatus as defined in claim 11 wherein the cover comprises a generally tubular section for closing off the space through the reflected light path in the one position of the cover, wherein the means for contacting the end of the tube comprises a generally annular shoulder.

* * * * *